United States Patent
Nakano

(10) Patent No.: US 8,306,684 B2
(45) Date of Patent: Nov. 6, 2012

(54) AUTONOMOUS MOVING APPARATUS

(75) Inventor: Tsuyoshi Nakano, Kyoto (JP)

(73) Assignee: Murata Machinery, Ltd., Kyoto (JP)

(*) Notice: Subject to any disclaimer, the term of this patent is extended or adjusted under 35 U.S.C. 154(b) by 663 days.

(21) Appl. No.: 12/506,366

(22) Filed: Jul. 21, 2009

(65) Prior Publication Data

US 2010/0049391 A1   Feb. 25, 2010

(30) Foreign Application Priority Data

Aug. 25, 2008 (JP) ................ 2008-214871
Nov. 20, 2008 (JP) ................ 2008-297345

(51) Int. Cl.
*G05B 15/00* (2006.01)
*G01C 9/00* (2006.01)
*G05D 1/08* (2006.01)

(52) U.S. Cl. ......... 701/23; 701/409; 701/450; 701/25; 702/150; 702/154; 700/258

(58) Field of Classification Search ............ 700/245, 700/259, 253, 258; 701/498, 23, 25, 27, 701/28, 409, 445, 450, 469, 514, 523; 702/150, 702/154
See application file for complete search history.

(56) References Cited

U.S. PATENT DOCUMENTS

| | | | | |
|---|---|---|---|---|
| 2005/0096790 | A1* | 5/2005 | Tamura et al. | 700/245 |
| 2005/0182518 | A1* | 8/2005 | Karlsson | 700/253 |
| 2007/0061043 | A1* | 3/2007 | Ermakov et al. | 700/263 |
| 2007/0199108 | A1* | 8/2007 | Angle et al. | 901/17 |
| 2008/0119961 | A1* | 5/2008 | Myeong et al. | 700/262 |

FOREIGN PATENT DOCUMENTS

| | | |
|---|---|---|
| JP | 61-161523 A | 7/1986 |
| JP | 2007-094743 A | 4/2007 |

OTHER PUBLICATIONS

Bourbakis, "Design of an Autonomous Navigation System" IEEE Control System Magazine, 1988, p. 25-28.*

* cited by examiner

Primary Examiner — Christine Behncke
(74) Attorney, Agent, or Firm — Keating & Bennett, LLP

(57) ABSTRACT

An autonomous moving apparatus arranged to travel autonomously in a surrounding environment preferably includes: a distance measuring sensor arranged to output detection waves, detect a distance between the apparatus and an object which has reflected the detection wave based on a reflection state of the detection wave, and acquire information about the distance between the apparatus and the object which exists in the surroundings of the apparatus; an inclination sensor arranged to detect an inclination of the distance measuring sensor; and a control unit arranged to estimate the self-position in the surrounding environment and generate the global map of the surrounding environment based on the distance information. When the distance measuring sensor is determined to be inclined based on a detection result of the inclination sensor, the control unit stops estimating the self-position based on the distance information and stops generating the global map based on the distance information.

12 Claims, 10 Drawing Sheets

FIG. 7

$$\begin{bmatrix} dx \\ dy \\ d\phi \end{bmatrix} = \frac{1}{4} \begin{bmatrix} \frac{1}{\cos\alpha} & \frac{1}{\cos\alpha} & \frac{1}{\cos\alpha} & \frac{1}{\cos\alpha} \\ \frac{1}{\sin\alpha} & -\frac{1}{\sin\alpha} & \frac{1}{\sin\alpha} & -\frac{1}{\sin\alpha} \\ \frac{1}{L} & -\frac{1}{L} & -\frac{1}{L} & \frac{1}{L} \end{bmatrix} \begin{bmatrix} c_0 \\ c_1 \\ c_2 \\ c_3 \end{bmatrix} \quad \cdots (1)$$

$$S = \sqrt{dx^2 + dy^2} \quad \cdots (2)$$

AUTONOMOUS MOVING APPARATUS

CROSS-REFERENCE TO RELATED APPLICATIONS

This application claims priority under 35 U.S.C. 119 to Japanese Patent Applications No. 2008-214871 filed on Aug. 25, 2008 and No. 2008-297345 filed on Nov. 20, 2008, which applications are hereby incorporated by reference in their entirety.

BACKGROUND OF THE INVENTION

1. Field of the Invention

The present invention relates to an autonomous moving apparatus arranged to autonomously move. In particular, the present invention relates to an autonomous moving apparatus arranged to estimate a self-position and/or generate a global map of the surroundings of the autonomous moving apparatus while moving.

2. Description of the Related Art

A conventionally-known autonomous moving apparatus (for example, a robot or an unmanned transfer vehicle) moves autonomously in an environment such as a hospital, office, warehouse, factory, or the like. In order for the autonomous moving apparatus to autonomously move in the environment, it needs a global map of the surroundings (hereinafter, referred to as the "global map") of a set position of the autonomous moving apparatus and position (self-position) information of the autonomous moving apparatus on the global map. A Simultaneous Localization and Mapping (SLAM) technique, which simultaneously estimates a self-position and generates a global map in real time, has been attracting attention in the technical field of the autonomous moving apparatus. In the SLAM technique, the autonomous moving apparatus includes a distance measuring sensor such as, but not limited to, a Laser Range Finder (LRF), for example, acquires a local map of the surroundings (hereinafter, referred to as the "local map") of the apparatus by measuring a distance between the apparatus and an object (for example, walls and obstacles, etc.) that exists in the surroundings of the apparatus with the sensor, estimating the self-position based on the local map, and generating or updating the global map.

The above laser range finder emits a laser, detects when the laser is reflected by an object, measures time from when the laser is emitted until when a reflected wave is detected, and thus measures the distance between the autonomous moving apparatus and the object. Further, the laser range finder includes a rotating mirror, reflects the emitted laser by the rotating mirror, scans the laser in a fan-shaped form in a horizontal direction, for example, and thus detects the shape of objects that exist in the surroundings of the autonomous moving apparatus. When the autonomous moving apparatus accelerates/decelerates, for example, or when the autonomous moving apparatus has made (or is in) contact with an obstacle, the autonomous moving apparatus inclines, and the laser range finder of the autonomous moving apparatus resultantly inclines. When the laser range finder inclines, an output direction of the laser varies. As a result, a position or an object that is different from the position or the object that is supposed to be irradiated with the laser when the laser range finder is not inclined is irradiated with the laser, and consequently, a distance (incorrect distance) between the apparatus and the position or the object that is different from the position or object detected in a normal state (i.e., the state in which the laser range finder is not inclined) may be detected. When the apparatus detects the distance between the apparatus and the position or the object that is different from the position or the object that is supposed to be detected, the self-position is improperly estimated based on the incorrect detected distance, and the incorrect self-position may be estimated. Moreover, when the global map is generated or updated based on the incorrect detected distance, an incorrect global map may be generated or updated.

SUMMARY OF THE INVENTION

According to preferred embodiments of the present invention, the reduction of the estimation accuracy of a self-position and the increase of errors in the generation of a global map, both arising from posture changes (inclination variations) of an autonomous moving apparatus, can be minimized.

According to a preferred embodiment of the present invention, an autonomous moving apparatus estimates a self-position in the surrounding environment and/or generates a global map while autonomously moving in its surrounding environment. The autonomous moving apparatus preferably includes a distance information acquiring unit, a self-position estimating unit, a global map generating unit, and an inclination detecting unit. The distance information acquiring unit is arranged to output detection waves, measure a distance between an object and the autonomous moving apparatus based on a reflection state of the detection wave reflected by the object existing in the surrounding environment, and thus acquires information about the distance between the apparatus and the object. The self-position estimating unit is arranged to estimate the self-position in the surrounding environment based on the distance information acquired by the distance information acquiring unit. The global map generating unit is arranged to generate the global map of the surrounding environment based on the distance information. The inclination detecting unit is arranged to detect an inclination of the distance information acquiring unit. When it is determined from a detection result of the inclination detecting unit that the distance information acquiring unit is inclined, the self-position estimating unit stops estimating the self-position based on the distance information, and the global map generating unit stops generating the global map based on the distance information.

According to a preferred embodiment of the present invention, the distance information acquiring unit preferably acquires information about the distance between the apparatus and the object based on the reflection state (such as propagation time, phase displacement, and displacement of propagation paths, for example) of the output detection wave, however, when the distance information acquiring unit is inclined, the self-position estimation and/or the global map generation based on the distance information acquired by the distance information acquiring unit are stopped. Therefore, when the distance information acquiring unit is inclined, such as when the autonomous moving apparatus accelerates/decelerates, or when the autonomous moving apparatus makes (or is in) contact with an obstacle or the like (in other words, when a distance that is different from the distance that is supposed to be measured in a normal state is likely to be detected), the estimation of the self-position and/or the generation of the global map based on the distance information acquired by the distance information acquiring unit are stopped. Therefore, the estimation of the self-position and the generation of the global map based on the improperly acquired distance information can be prevented. As a result, the reduction of the estimation accuracy of the self-position and/or the increase of errors in the generation of the global map, both arising from posture changes of the autonomous moving apparatus, can be minimized. The idea of "generating the global map" includes an idea of "generating and updating the global map".

In the autonomous moving apparatus according to a further preferred embodiment of the present invention, when the state of inclination of the distance information acquiring unit is changing, the self-position estimating unit stops estimating the self-position based on the distance information, and the global map generating unit stops generating the global map based on the distance information.

When the state of inclination of the distance information acquiring unit is changing, the estimation of the self-position and/or the generation of the global map based on the distance information acquired by the distance information acquiring unit are stopped. Therefore, even when the distance information acquiring unit is inclined, unless the state of inclination is changing, the estimation of the self-position and/or the generation of the global map based on the distance information acquired by the distance information acquiring unit will not be stopped. Accordingly, the estimation of the self-position and/or the generation of the global map can be properly performed in a situation where the autonomous moving apparatus travels, for example, up a constantly-inclined slope in a constant posture.

According to a further preferred embodiment of the present invention, the autonomous moving apparatus includes a plurality of wheels arranged to move the apparatus and a travel amount calculating unit arranged to acquire a travel amount of the apparatus based on a rotation amount of each of the plurality of wheels. When the inclination detecting unit detects that the state of inclination of the distance information acquiring unit is changing, the self-position estimating unit estimates the self-position based on the travel amount acquired by the travel amount calculating unit.

When the state of inclination of the distance information acquiring unit is changing, the self-position is estimated based on the travel amount acquired based on the rotation amounts of the plurality of wheels. Therefore, even when the self-position estimation based on the distance information acquired by the distance information acquiring unit is stopped, the self-position can be obtained.

According to a further preferred embodiment of the present invention, when the state of inclination of the distance information acquiring unit stops changing, the global map generating unit preferably resumes the generation of the global map based on the distance information, and the self-position estimating unit resumes the self-position estimation based on the distance information.

In the above case, when the state of inclination of the distance information acquiring unit stops changing, the self-position estimation and/or the global map generation based on the acquired distance information are resumed. As described above, when the state of inclination of the distance information acquiring unit is changing, the self-position is estimated based on the travel amount acquired based on a drive amount of each of the plurality of wheels. Therefore, the self-position estimation and/or the global map generation are continued from the position estimated based on the travel amount.

According to a further preferred embodiment of the present invention, the distance information acquiring unit is preferably a laser range finder.

The laser range finder has a high resolution and measurement accuracy in an angular direction and a distance direction and can measure a distance between the apparatus and an object at high speed. Therefore, by adopting the laser range finder as the distance information acquiring unit, the distance between the apparatus and the object existing in the surroundings of the apparatus can be accurately measured at high speed. In other words, the self-position estimation and/or the global map generation can be accurately performed at high speed.

A further preferred embodiment of the present invention provides a display unit arranged to display in real time the global map generated by the global map generating unit.

Accordingly, since the latest global map generated by the global map generating unit is displayed in real time on the display unit, an operator of the autonomous moving apparatus can check how the actual surrounding environment matches the global map displayed on the display unit and/or can check the self-position on the global map while estimating the self-position and/or generating the global map.

According to a further preferred embodiment of the present invention, the display unit is preferably arranged on a rear surface side of the autonomous moving apparatus and outside a detection area of the distance information acquiring unit.

Therefore, even when the operator stands in front of the display unit (i.e., on the rear surface side of the autonomous moving apparatus) to check the information displayed on the display unit, the operator will not prevent the autonomous moving apparatus from moving ahead. Moreover, situations where the operator is reflected as an obstacle on the global map can be minimized. In other words, the generation of an incorrect global map can be minimized.

According to the above preferred embodiments of the present invention, when the distance information acquiring unit is inclined, the self-position estimation and/or the global map generation based on the distance information acquired by the distance information acquiring unit are stopped. Therefore, in the autonomous moving apparatus arranged to estimate the self-position and/or generate the global map while moving, the reduction of the estimation accuracy of the self-position and/or the increase of errors in the generation of the global map, both arising from posture changes of the autonomous moving apparatus, can be minimized.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 7 is a relational expression of the travel amount and the rotation amount of the autonomous moving apparatus and the amount of wheel movement and the direction of each omni-wheel according to a preferred embodiment of the present invention.

DETAILED DESCRIPTION OF PREFERRED EMBODIMENTS

Figure 1:
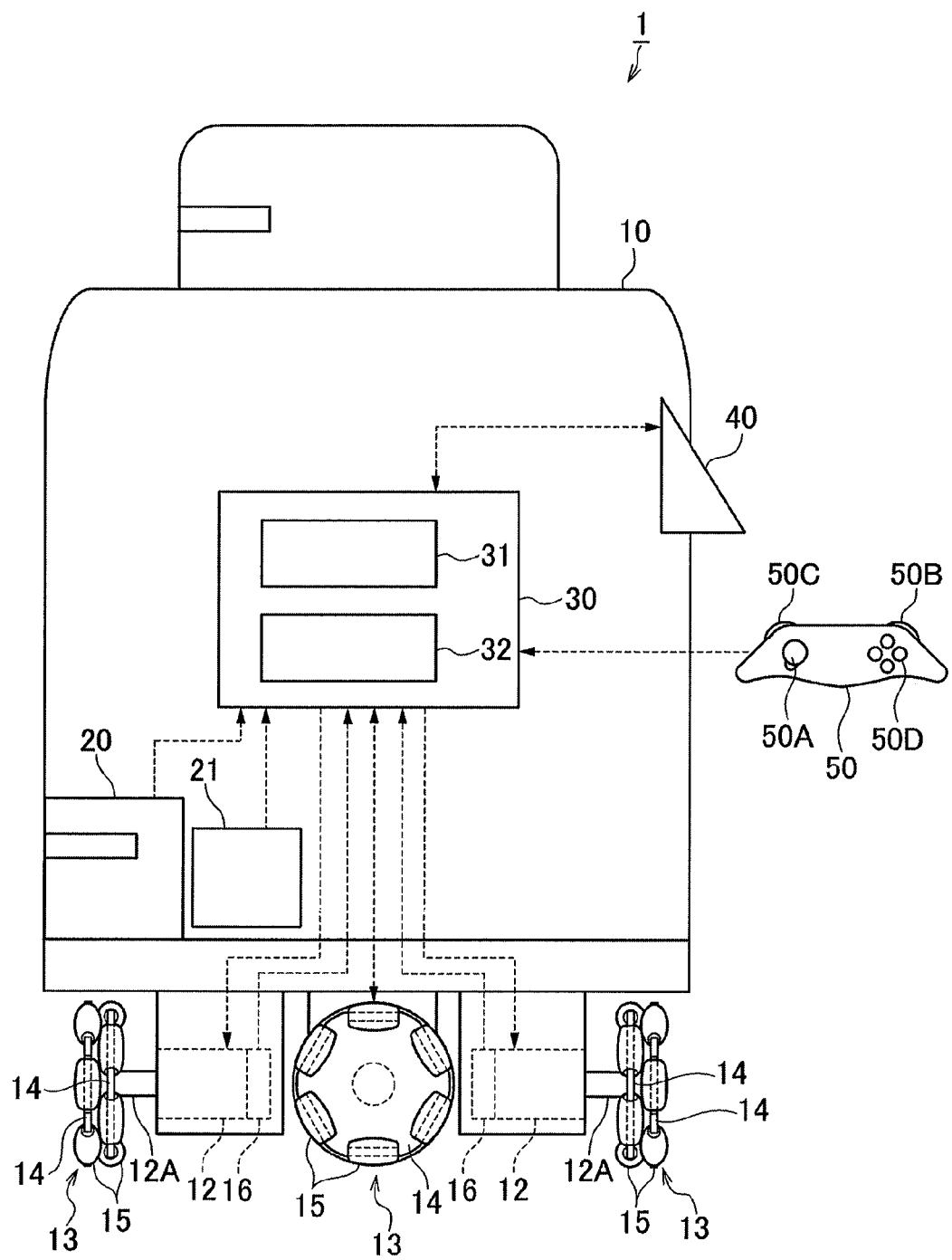
FIG. 1 is a block diagram of a configuration of an autonomous moving apparatus according to a preferred embodiment of the present invention.
Figure 2:
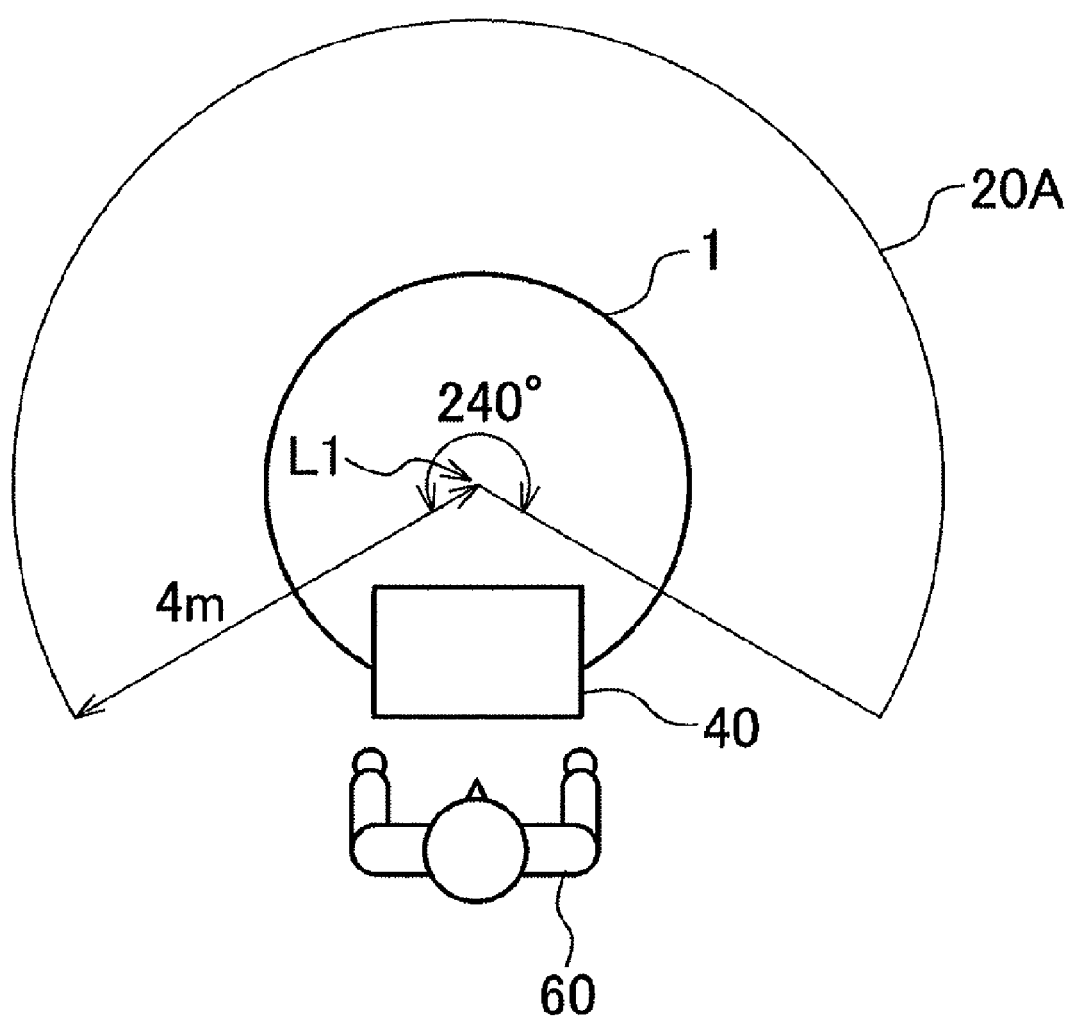
FIG. 2 represents a relationship between a detection area of a laser range finder and an arrangement of a touch-screen display according to a preferred embodiment of the present invention.

A configuration of an autonomous moving apparatus 1 according to a preferred embodiment of the present invention will be described with reference to FIGS. 1 and 2. FIG. 1 is a block diagram of a preferred configuration of the autonomous moving apparatus 1. FIG. 2 illustrates a relationship between a detection area 20A of a laser range finder 20 and an arrangement of a touch-screen display 40.

Assuming that a left side of FIG. 1 corresponds to a front side of the apparatus, the autonomous moving apparatus 1 can be manually moved/operated by an operator's control operations and can autonomously move/operate based on a self-judgment in all horizontal directions (by 360 degrees around the apparatus) and also in a pivoting manner around a center L1 of the apparatus. The autonomous moving apparatus 1 preferably has a (SLAM) function of autonomously moving in the surrounding environment while simultaneously estimating a self-position and generating a global map. Accordingly, the autonomous moving apparatus 1 preferably includes: a main body 10 provided with electric motors 12 and omni-wheels 13 that are driven by the electric motors 12, each of the motors 12 and the omni-wheels 13 being preferably arranged in a lower portion of the main body 10; a laser range finder 20 arranged to measure a distance between the apparatus 1 and an object (for example, walls and obstacles etc.) existed in the surroundings; an acceleration sensor 21 arranged to detect an inclination of the laser range finder 20; a touch-screen display 40 provided as a display unit and an input unit; and a joystick 50 provided as an operation unit for an operator 60 to manually move the autonomous moving apparatus 1. The autonomous moving apparatus 1 preferably further includes an electronic control device 30. The electronic control device 30 is arranged to estimate the self-position and generate/update the global map based on a detection result of the laser range finder 20 when the laser range finder 20 is not inclined or when the state of inclination is constant, and arranged to stop the estimation of the self-position and the generation/update of the global map based on the detection result of the laser range finder 20 when the laser range finder 20 is inclined and when the state of inclination is not constant (i.e., when the state of inclination is changing). The electronic control device 30 is arranged to receive instructions from the operator 60 via the touch-screen display 40 and the joystick 50 and controls a display of the touch-screen display 40. Each of the constituent elements will now be described in detail.

The main body 10 is preferably a metal frame having, but not limited to, a substantially cylindrical shape with a bottom, for example. The main body 10 includes the acceleration sensor 21, the electronic control device 30, and the touch-screen display 40 or the like above laser range finder 20. There are preferably four electric motors 12 that are arranged in a cross shape on the lower portion of the main body 10. The omni-wheels 13 are attached to respective drive axes 12A of the four electric motors 12. In other words, the four omni-wheels 13 are preferably arranged on the same circumference with intervals of about 90 degrees between each other along a circumferential direction.

The omni-wheel 13 is a wheel that preferably includes two separate wheels 14 arranged to rotate about the drive axis 12A of the electric motor 12 and six free rollers 15 provided on an outer circumference of each of the wheels 14 in such a manner that the free rollers 15 can rotate about an axis that is perpendicular or substantially perpendicular to the drive axis of the electric motor 12. The omni-wheel 13 is thus capable of omnidirectional movement. The two wheels 14 are arranged with phases thereof shifted by 30 degrees. With the above configuration, when the electric motor 12 is driven, and the wheel 14 is resultantly rotated, the six free rollers 15 are rotated along with the wheel 14. By rotating the free roller 15 that is in contact with a ground, the omni-wheel 13 can also move in a direction that is parallel or substantially parallel with a rotational axis of the wheel 14. Therefore, by individually controlling the four electric motors 12, and by individually controlling a rotational direction and a rotational speed of each of the four omni-wheels 13, the autonomous moving apparatus 1 can horizontally move in a prescribed direction (in any desired direction) and can pivot about the center L1 of the apparatus.

Each of the drive axes 12A of the four electric motors 12 is preferably provided with an encoder 16 arranged to detect an angle of rotation (i.e., a drive amount or a rotation amount) of the corresponding drive axis 12A. Each of the encoders 16 is connected with the electronic control device 30 and outputs the detected rotation angle of each of the electric motors 12 to the electronic control device 30. The electronic control device 30 calculates a travel amount and direction of the autonomous moving apparatus 1 in accordance with the input rotation angle of each of the electric motors 12. A method of calculating the travel amount and direction of the autonomous moving apparatus 1 will be described later in detail. The encoders 16 and the electronic control device 30 function as a travel amount calculating unit.

The laser range finder 20 is preferably attached to a front portion of the autonomous moving apparatus 1 to face a front direction of the apparatus. By emitting a laser (a detection wave) and reflecting the emitted laser by a rotatable mirror, the laser range finder 20 horizontally scans the surroundings of the autonomous moving apparatus 1. More specifically, as illustrated in FIG. 2, the laser range finder 20 preferably has a fan-shaped detection area 20A with a radius of about four meters from the center L1 of the apparatus, and the fan-shaped detection area 20A spreads by about 120 degrees positively and negatively from the front direction, which is set as a point of origin (0 degree). Accordingly, the laser range finder 20 detects when the laser is reflected by an object existing in the detection area 20A, measures a detection angle of the laser (reflected wave) and time (propagation time) from when the laser is emitted to when the laser is reflected by the object, and thus detects the angle with respect to the object and a distance between the apparatus 1 and the object. In other words, the laser range finder 20 functions as a distance information acquiring unit. The laser range finder 20 is connected with the electronic control device 30 and outputs distance information and angle information regarding the object detected in the surroundings to the electronic control device 30.

The acceleration sensor 21 is preferably attached directly to the laser range finder 20 or to the vicinity of the laser range finder 20. The acceleration sensor 21 is arranged to output a voltage in accordance with a direction of a gravitational acceleration with respect to a detection axis, and detects an angle of inclination of the laser range finder 20 with respect to a horizontal plane, i.e., detects the inclination in front, back, right, and left directions. Therefore, the acceleration sensor 21 functions as an inclination detecting unit. Various types of acceleration sensors may be adopted, however, a capacitance sensor is used in the present preferred embodiment as the acceleration sensor 21.

The touch-screen display 40 is preferably arranged to display, for example, the global map and various statuses of the autonomous moving apparatus 1. As illustrated in FIG. 2, the touch-screen display 40 is preferably arranged on a rear surface side of the autonomous moving apparatus 1 and outside the fan-shaped detection area 20A of the above laser range finder 20 such that an operation displaying surface thereof faces the rear direction, and that the display 40 is inclined slightly backwards. The joystick 50 is preferably an operation unit arranged to manually move the autonomous moving apparatus 1 and is connected with the electronic control device 30 via a cable having a prescribed length or via an interface (not illustrated). The joystick 50 preferably includes at least: a directional lever 50A arranged to input instructions for horizontally moving the autonomous moving apparatus 1 in the front, back, right, and left directions; a clockwise turning button 50B arranged to input instructions for turning the autonomous moving apparatus 1 rightward around the center L1 of the apparatus; a counter-clockwise turning button 50C arranged to input instructions for turning the autonomous moving apparatus 1 leftward around the center L1 of the apparatus; and a confirm button 50D arranged to input instructions for registering, for example, the self-position of the apparatus on the global map.

As illustrated in FIG. 2, the operator 60 preferably stands on the rear surface side of the autonomous moving apparatus 1 and inputs the instructions using the touch-screen display 40 and the joystick 50 to the electronic control device 30. The autonomous moving apparatus 1 is provided, for example, with a setting mode in which the global map of the surrounding environment of the autonomous moving apparatus 1 is generated/updated and a moving mode in which the autonomous moving apparatus 1 moves to a destination based on a self-judgment, and the modes are switched when the operator 60 presses either a moving mode icon 40A or a setting mode icon 40B on a task selection screen (FIG. 8) arranged on the touch-screen display 40. When manually moving the autonomous moving apparatus 1 at the time of executing the setting mode (i.e., at the time of generating the global map), the operator 60 inputs a movement instruction using the joystick 50.

The electronic control device 30 comprehensively controls the autonomous moving apparatus 1. The electronic control device 30 preferably includes: a micro processor arranged to perform calculations; a Read Only Memory (ROM) arranged to store programs etc. for executing various processes through the micro processor; a Random Access Memory (RAM) arranged to temporarily store various data such as calculation results; a backup RAM arranged to retain storage contents thereof using a battery. The electronic control device 30 further includes: an interface circuit arranged to electrically connect the laser range finder 20, the acceleration sensor 21, the touch-screen display 40, and the joystick 50 with the micro processor; and a driver circuit arranged to drive the electric motors 12, or the like.

The electronic control device 30 moves the autonomous moving apparatus 1 in either the setting mode or the moving mode and implements a (SLAM) function of autonomously moving the apparatus in the surrounding environment while simultaneously estimating the self-position and generating the global map. The setting mode is defined as a mode in which the autonomous moving apparatus 1 generates/updates the global map of the surrounding environment for the autonomous movement through the SLAM function while the operator 60 uses the joystick 50 and the touch-screen display 40 to manually move the autonomous moving apparatus 1 horizontally in a pivoting manner. The moving mode is defined as a mode in which the autonomous moving apparatus 1 autonomously moves while checking the self-position and updating the global map through the SLAM function until the apparatus 1 arrives at a destination (goal) designated on the global map by the operator 60 through the touch-screen display 40. When the programs are executed, the electronic control device 30 implements a function of a self-position estimating unit 31 and a function of a global map generating unit 32. The self-position estimating unit 31 is arranged to estimate the self-position based on the distance information and the angle information both acquired by the laser range finder 20 and on the rotation angle of each of the electric motors 12 detected by the encoders 16. The global map generating unit 32 is arranged to generate the global map based on the distance information and the angle information both acquired by the laser range finder 20.

When any of the setting mode and the moving mode is executed, and when the laser range finder 20 is not inclined, more specifically, when the state of inclination per unit of time does not change, the self-position estimating unit 31 generates a local map based on the distance information and the angle information regarding the object existed in the surroundings, which information is read (acquired) by the laser range finder 20, and then calculates the travel amount of the apparatus based on the rotation angle of each of the electric motors 12 as read by the encoders 16. Thus, the self-position estimating unit 31 stochastically estimates the self-position using a Bayes' filter (Bayes' theorem) based on the generated local map and the travel amount of the apparatus.

When any of the setting mode and the moving mode is executed, and when the laser range finder 20 is inclined, the self-position estimating unit 31 acquires a differential value (or a delta, i.e., the change of the inclination per unit of time) of the inclination of the laser range finder 20 detected by the acceleration sensor 21. When the acquired differential value falls below a prescribed value (for example, five degrees/sec), the self-position estimating unit 31 estimates the self-position as described above. When the acquired differential value is more than or equal to the prescribed value, i.e., when the inclination of the laser range finder 20 is changing, the self-position estimation using the detection result of the laser range finder 20 is stopped, and the self-position is estimated based on the travel amount of the apparatus acquired from the rotation angle of each of the electric motors 12 (i.e., a dead reckoning process is executed). In other words, the electronic control device 30 (the self-position estimating unit 31) functions as a self-position estimating unit.

When the laser range finder 20 is not inclined, the global map generating unit 32 performs a coordinate conversion on the local map that has the laser range finder 20 as the origin and that is generated by the self-position estimating unit 31, by adjusting the self-position from a coordinate system having the laser range finder 20 as the origin to a coordinate system of the global map, and thus reflects the local map onto the global map. Then, the global map generating unit 32 repeatedly executes the above process during each control period of the autonomous moving apparatus 1 (the electronic control device 30) and sequentially adds the local map to the global map to generate or update the global map of the entire surrounding environment.

When the laser range finder 20 is inclined, the global map generating unit 32 acquires the differential value (or the delta) of the state of inclination of the laser range finder 20. When the acquired differential value (or the delta) of the inclination of the laser range finder 20 falls below the prescribed value (for example, five degrees/sec), the process of generating/updating the global map is performed as described above. When the differential value of the state of inclination of the laser range finder 20 is more than or equal to the prescribed value, i.e., when the state of inclination of the laser range finder 20 is changing, the process of generating/updating the global map using the detection results of the laser range finder 20 is stopped. In other words, the electronic control device 30 (the global map generating unit 32) functions as a global map generating unit.

Figure 3:
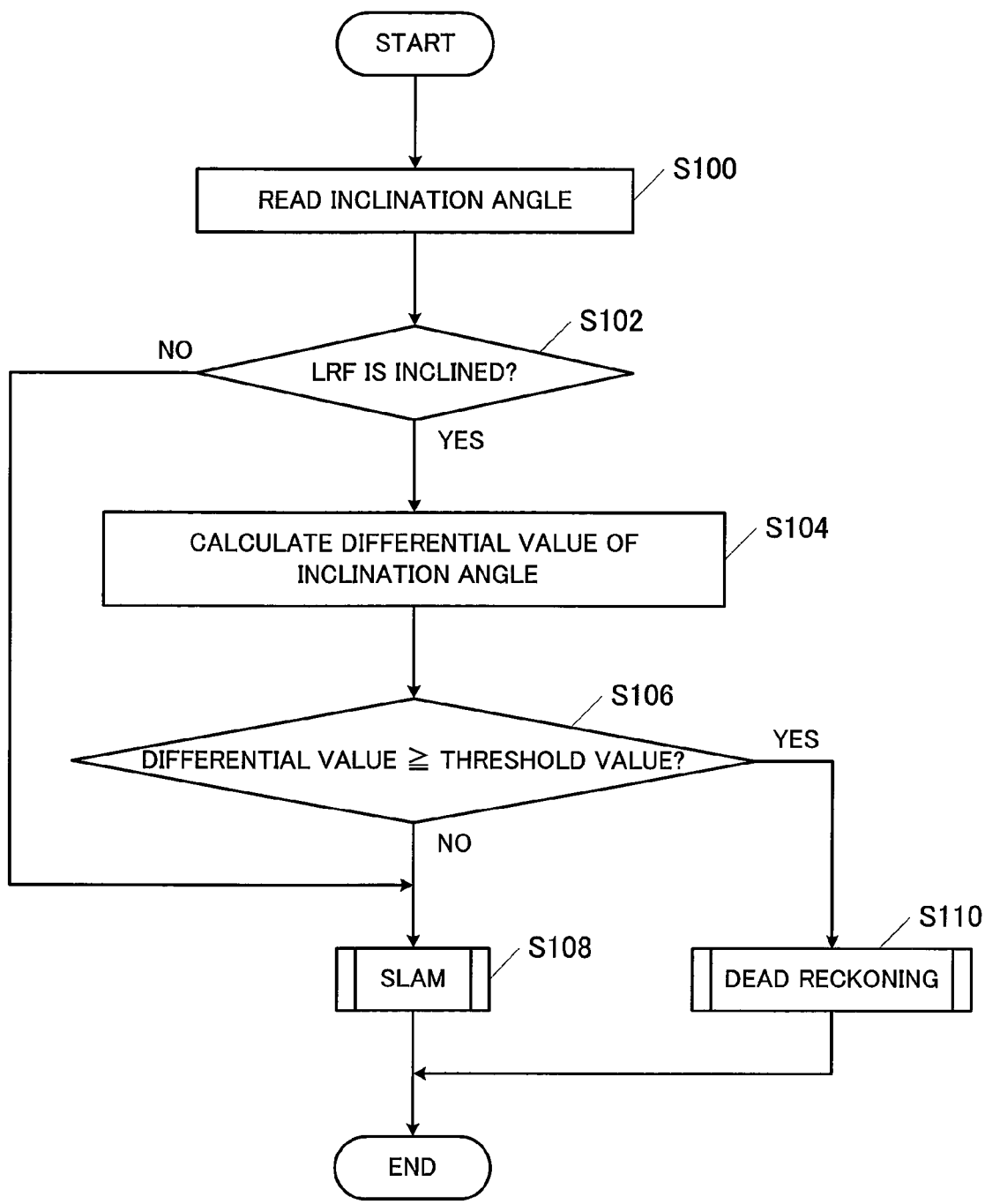
FIG. 3 is a flowchart representing steps of a process of switching between a SLAM function and a dead reckoning function of the autonomous moving apparatus according to a preferred embodiment of the present invention.
Figure 4:
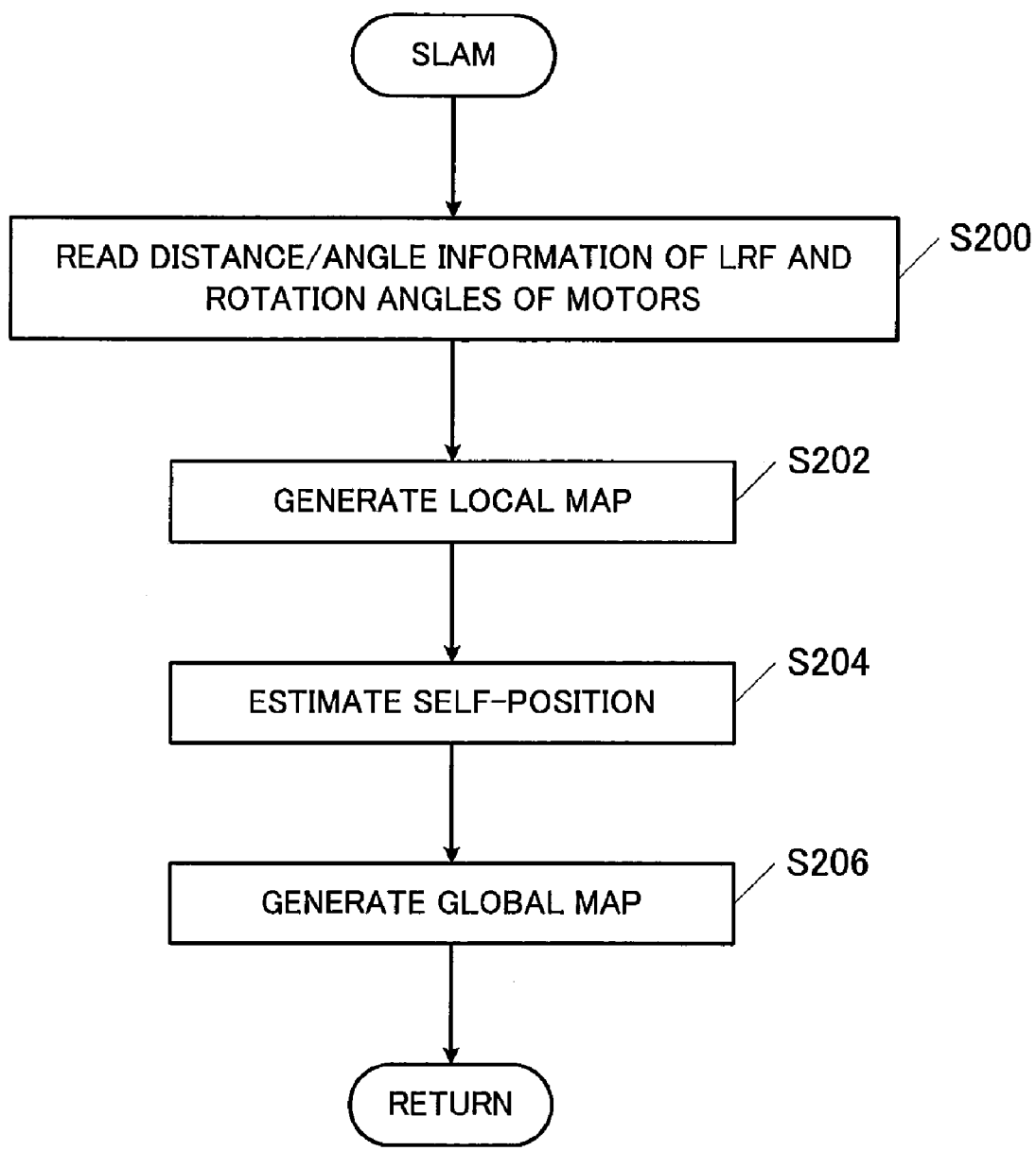
FIG. 4 is a flowchart representing steps of a process of the SLAM function performed by the autonomous moving apparatus according to a preferred embodiment of the present invention.
Figure 5:
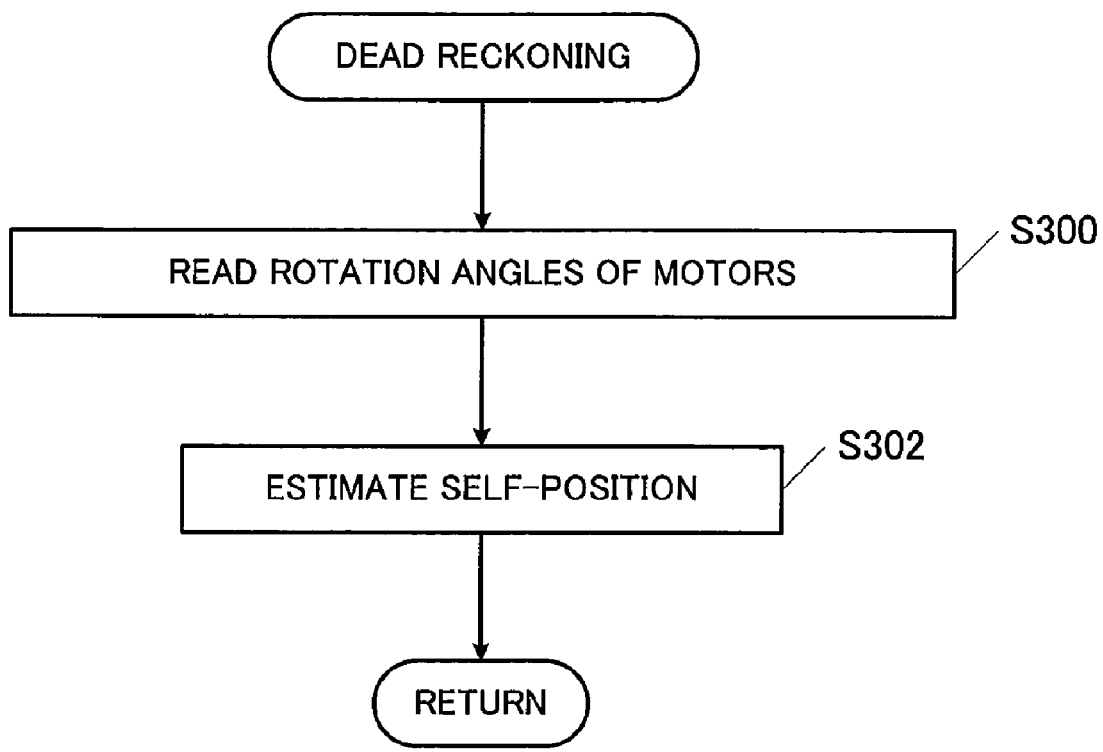
FIG. 5 is a flowchart representing process steps of the dead reckoning function performed by the autonomous moving apparatus according to a preferred embodiment of the present invention.

With reference to FIGS. 3 through 5, operations of the autonomous moving apparatus 1, in particular, operations of executing the setting mode for generating the global map, will be described by way of an example. Similar operations are also performed in a case where the moving mode is executed instead of the setting mode, except that the manual movement based on the instructions of the operator 60 changes to the autonomous movement based on the self-judgment. FIG. 3 is a flowchart representing procedures of a process of switching between the SLAM function and the dead reckoning function performed by the autonomous moving apparatus 1. FIG. 4 is a flowchart representing procedures of the SLAM process performed by the autonomous moving apparatus 1. FIG. 5 is a flowchart representing procedures of the dead reckoning process performed by the autonomous moving apparatus 1. Each of the processes represented in FIG. 3 through FIG. 5 is primarily performed by the electronic control device 30 and repeatedly executed every prescribed control period (for example, every 200 milliseconds) from when a power of the autonomous moving apparatus 1 is turned on until when the power is turned off.

Figure 8:
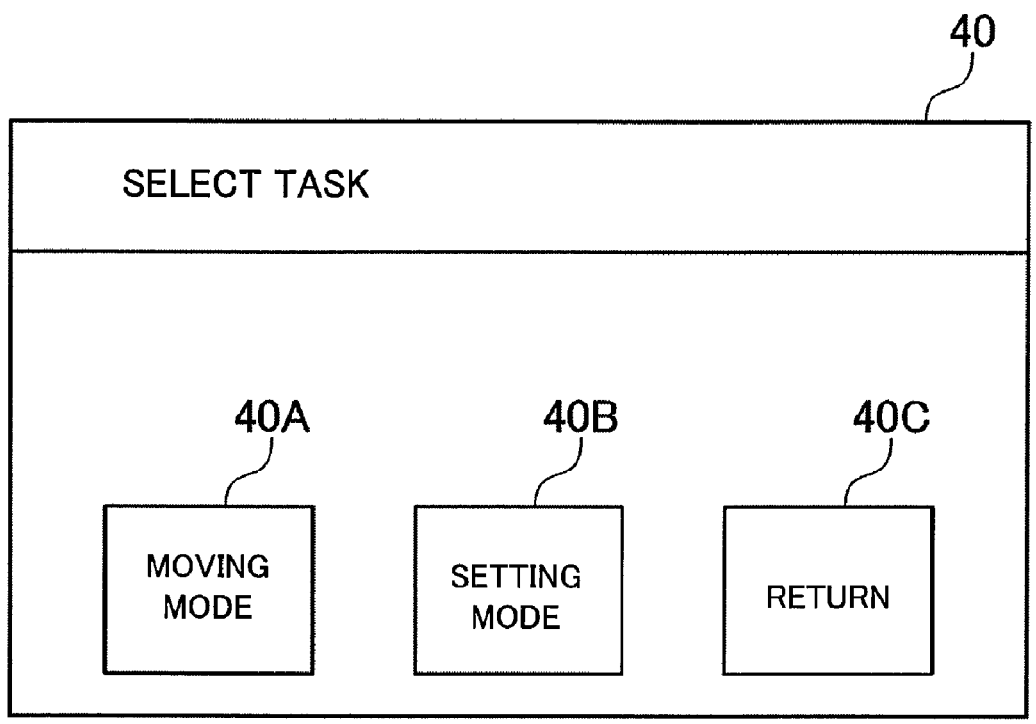
FIG. 8 illustrates an example of a task selection screen according to a preferred embodiment of the present invention.

On the task selection screen of the touch-screen display 40 illustrated in FIG. 8 as an example, the operator 60 touches the setting mode icon 40B to execute the setting mode. When the moving mode icon 40A is touched, the moving mode is executed, and when a return icon 40C is touched, a previous screen is displayed. The process performed in the setting mode will be described below.

A situation where the autonomous moving apparatus 1 performs only a pivoting operation on a flat floor without horizontal movement will be described. When the operator 60 operates the clockwise turning button 50B and the counter-clockwise turning button 50C of the joystick 50 at the self-position to turn the autonomous moving apparatus 1 by 360 degrees, the autonomous moving apparatus 1 detects the surroundings of the apparatus and adds the local map to the global map every control period. More specifically, an inclination angle is read in step S100. Since the autonomous moving apparatus 1 is turning on the flat floor, the laser range finder 20 is not inclined, which indicates "NO" in the process of step S102, and thus the process proceeds to step S108, where the SLAM function of FIG. 4 is executed. In the SLAM function, in addition to the distance information and the angle information of the laser range finder 20, the rotation angle of each of the electric motors 12 is read (step S200), and the local map is generated (step S202). Then, the self-position of the autonomous moving apparatus 1 is estimated based on the above information (step S204), and the local map is reflected onto the global map (step S206).

The global map that is generated/updated during each control period is displayed during each control period in real time on the touch-screen display 40. Accordingly, even when a moving obstacle such as the feet of the operator 60 or of a passerby enters the detection area 20A of the laser range finder 20 and is detected, for example, and when such an obstacle is resultantly reflected onto the global map as a moving obstacle, because the operator 60 can confirm the obstacle on the touch-screen display 40, the operator 60 updates the global map without horizontally moving the autonomous moving apparatus 1, and thus can acquire the global map on which only fixed obstacles are reflected, i.e., the global map on which no moving obstacles are reflected.

Next, a case where the autonomous moving apparatus 1 horizontally moves will be described. When the operator 60 operates the directional lever 50A of the joystick 50 to move the autonomous moving apparatus 1 in the front, back, right, and left directions, the inclination angle of the laser range finder 20, i.e., the inclination in the front, back, right, and left directions is read by the acceleration sensor 21 in step S100. Whether or not the laser range finder 20 is inclined is determined in step S102 based on the inclination angle read in step S100. When the laser range finder 20 is not inclined, the process proceeds to step S108. When the laser range finder 20 is inclined, the process proceeds to step S104, where the differential value (or the delta) of the inclination angle read in step S100 is calculated (step S104).

Then, whether or not the differential value of the inclination angle calculated in step S104 exceeds a prescribed threshold value (for example, 5 degrees/sec) is determined in step S106. When the differential value of the inclination angle falls below the prescribed threshold value, the process proceeds to S108 where the SLAM function is executed in which the self-position is estimated based on the distance information and the angle information acquired by the laser range finder 20 and on the rotation angle of each of the electric motors 12 detected by the encoders 16, and the global map is generated based on the distance information and the angle information acquired by the laser range finder 20. When the differential value of the inclination angle exceeds the prescribed threshold value, it is determined that the laser range finder 20 is vibrating, and the self-position estimation using the detection results of the laser range finder 20 is stopped. Then, the process proceeds to step S110, where the dead reckoning function is executed in which the self-position is estimated based on the travel amount of the apparatus acquired from the rotation angle of each of the electric motors 12.

With reference to FIGS. 4 and 5, the SLAM function executed in step S108 and the dead reckoning function executed in step 110 will be described. First, with reference to FIG. 4, the SLAM function implemented by the autonomous moving apparatus 1 will be described.

The distance information and the angle information acquired by the laser range finder 20 regarding the obstacle existed in the surroundings and the rotation angle of each the electric motors 12 detected by the encoders 16 are read in step S200.

Then, the process proceeds to step S202, where the local map having the laser range finder 20 as the origin is generated based on the distance information and the angle information regarding the obstacle existed in the surroundings read in step S200, and the travel amount of the apparatus is calculated based on the rotation angle of each of the electric motors 12.

Figure 6:
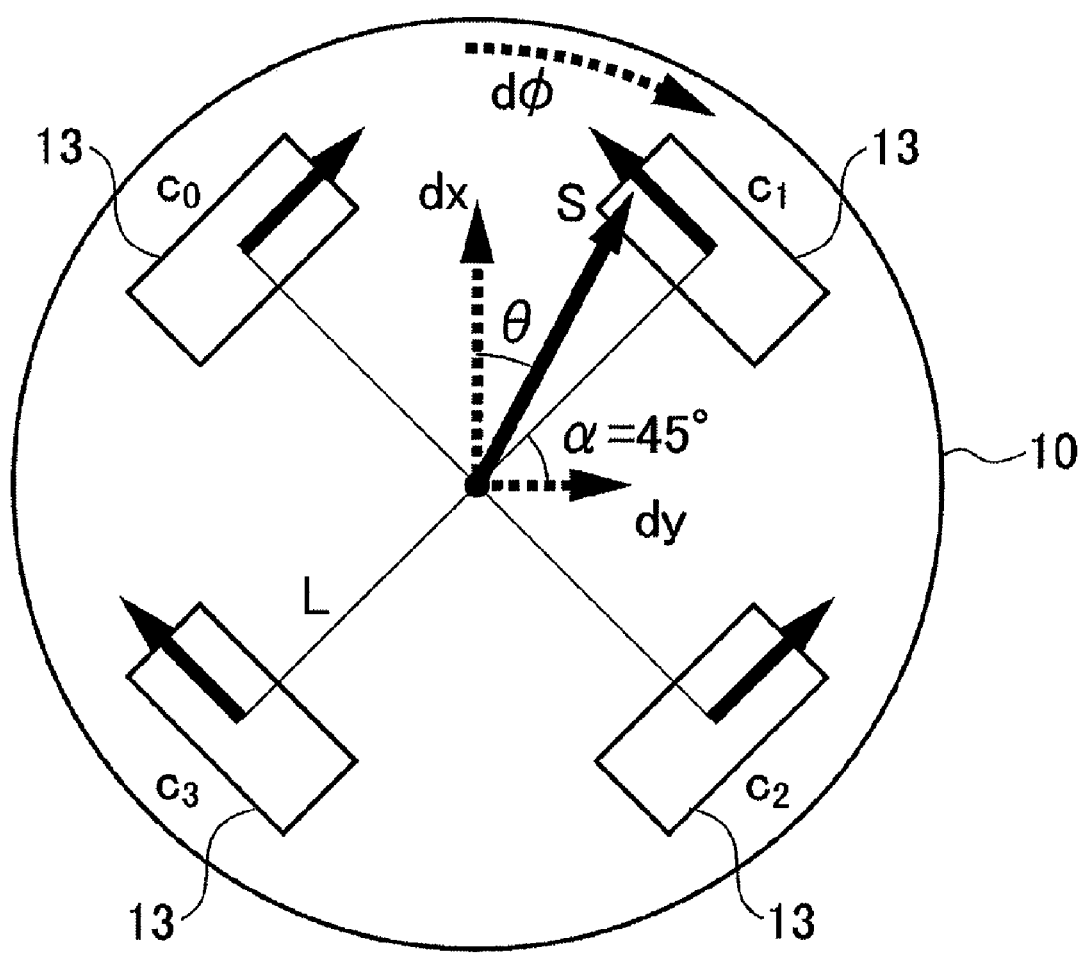
FIG. 6 represents the relationship between a travel amount and a rotation amount of the autonomous moving apparatus and an amount of wheel movement and a direction of each omni-wheel according to a preferred embodiment of the present invention.

With reference to FIGS. 6 and 7, a method of acquiring the travel amount (travel distance) and the direction of the apparatus based on the rotation angle of each of the electric motors 12, i.e., based on an amount of wheel movement of the omni-wheels 13 will be described. FIG. 6 represents the relationship between the travel amount and the amount of rotation of the autonomous moving apparatus 1 and the amount of wheel movement and the direction of each of the omni-wheels 13. FIG. 7 represents a relational expression of the travel amount and the rotation amount of the autonomous moving apparatus 1 and the amount of wheel movement and the direction of each of the omni-wheels 13.

As illustrated in FIG. 6, a distance from the center position of the four omni-wheels 13 to each of the omni-wheels 13 is defined as "L", and the inclination angle of the omni-wheel 13 is defined as "$\alpha$". In this preferred embodiment, the inclination angle "$\alpha$" is preferably set to 450, and the amount of wheel movement of each of the omni-wheels 13 acquired from the rotation angle of the electric motor 12 is defined as "ci" ("i" ranges from 0 to 3). Each element (dx, dy) of the travel amount and the rotation angle "$\phi$" of the autonomous moving apparatus 1 can be acquired by a formula (1) of FIG. 7. By substituting each element (dx, dy) of the travel amount of the autonomous moving apparatus 1 acquired in the above formula (1) to a formula (2), the travel amount "S" and the direction of the autonomous moving apparatus 1 can be acquired.

Referring to FIG. 4 again, in step S204, the self-position can be stochastically acquired using the Bayes' filter based on the local map generated in step S202 and on the travel amount of the apparatus.

Figure 9:
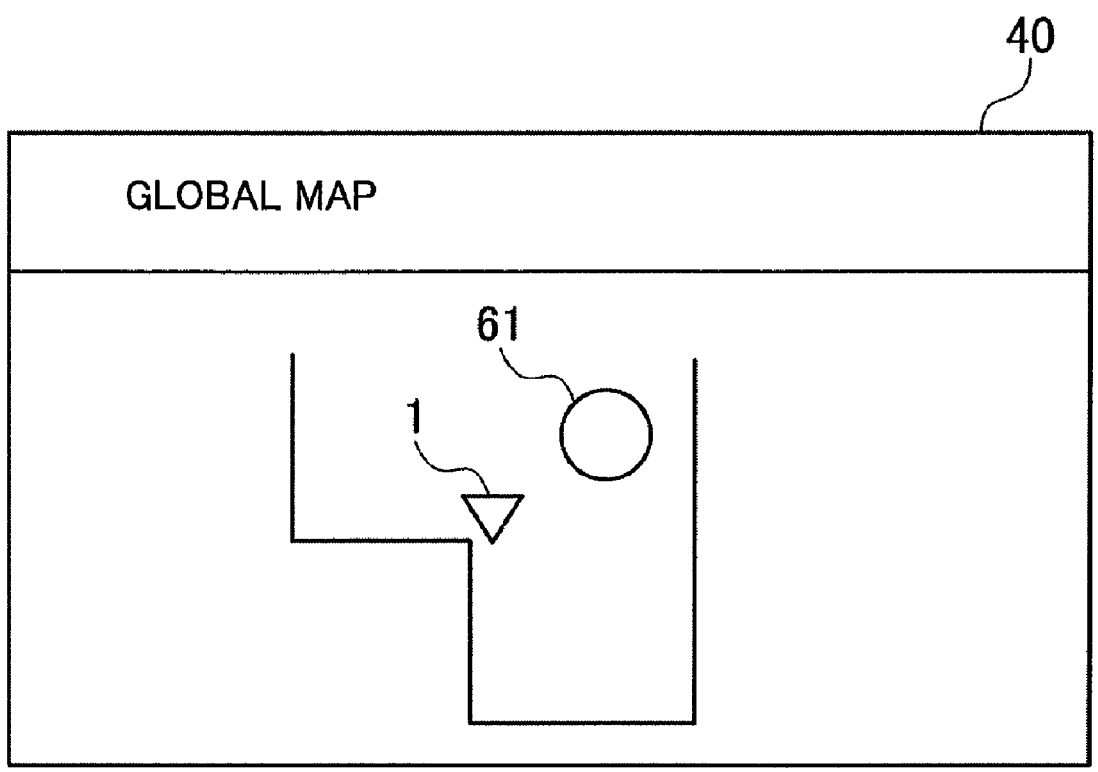
FIG. 9 illustrates an example of a global map on which a moving obstacle is reflected according to a preferred embodiment of the present invention.
Figure 10:
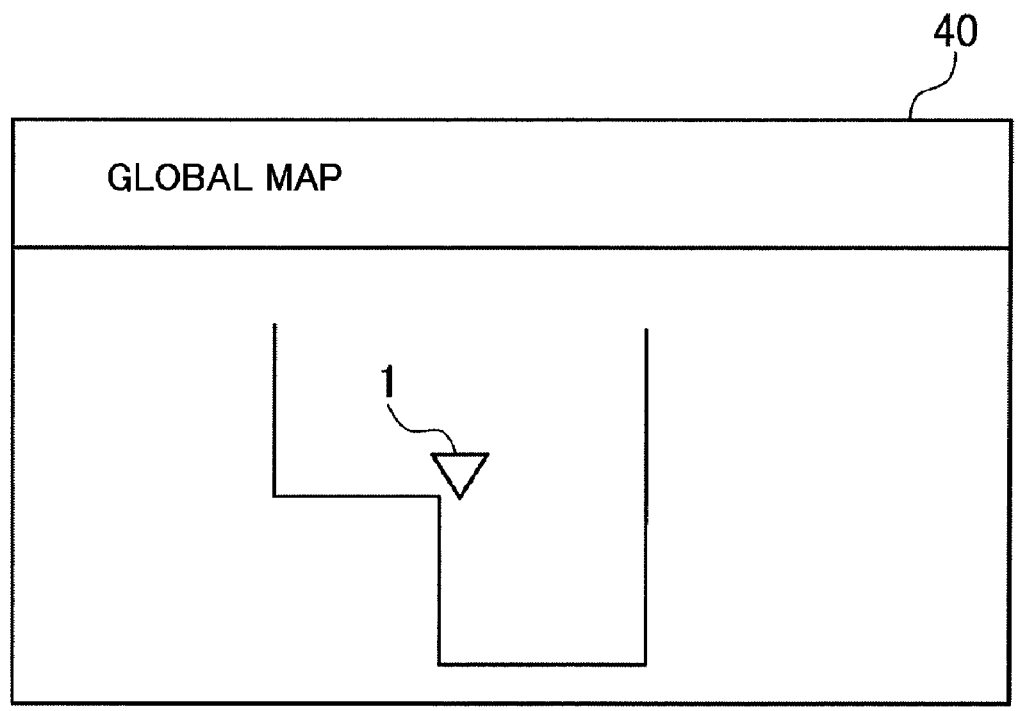
FIG. 10 illustrates an example of the global map that has removed the moving obstacle according to a preferred embodiment of the present invention.

In step S206, a coordinate conversion is performed on the local map generated in step S202, by adjusting the self-position from a coordinate system having the laser range finder 20 as the origin to a coordinate system of the global map, the local map is reflected on the global map, and thus the global map of the entire surrounding environment can be generated or updated. The global map that is generated/updated during each control period is displayed in real time on the touch-screen display 40 every control period. Therefore, even when a moving obstacle 61 such as a passerby enters the detection area 20A of the laser range finder 20, and when the moving obstacle 61 is detected and reflected on the global map as the moving obstacle (FIG. 9), for example, since the operator 60 can confirm the obstacle 61 on the touch-screen display 40, the operator 60 can generate or update the global map without horizontally moving the autonomous moving apparatus 1, or the operator 60 can generate or update the global map after confirming that the moving obstacle has departed from the detection area 20A, and then horizontally move the autonomous moving apparatus 1. Thus, the global map on which only fixed obstacles are reflected, i.e., the global map on which no moving obstacles are reflected (FIG. 10), can be acquired. After returning to the process of S108, the electronic control device 30 once ends the above process.

With reference to FIG. 5, the dead reckoning function by the autonomous moving apparatus 1 will be described. The rotation angle of each of the electric motors 12 detected by the encoders 16 is read in step S300. Then, in step S302, the travel amount of the apparatus is calculated based on the rotation angle of each of the electric motors 12 read in step S300, and the self-position is estimated based on the acquired travel amount of the apparatus. The method of acquiring the travel amount of the apparatus based on the rotation angle of each of the electric motors 12 has been described above, and the description thereof is omitted. After returning to the process of step S110 of FIG. 3, the electronic control device 30 once ends the above process.

In the present preferred embodiment, when the laser range finder 20, which acquires the distance information regarding the obstacle based on the propagation time of the output laser, is inclined, and when the state of inclination is changing, the self-position estimation and the generation of the global map based on the distance information acquired by the laser range finder 20 are stopped. Accordingly, when the autonomous moving apparatus 1 accelerates or decelerates, makes contact with an obstacle, hurdles a bump, or the like, and when the laser range finder 20 attached to the autonomous moving apparatus 1 resultantly vibrates (i.e., when there is a possibility of detecting a distance that is different from the distance detected in a normal state), the self-position estimation and the generation of the global map based on the distance information acquired by the laser range finder 20 are stopped. Therefore, the estimation of the self-position and/or the generation of the global map using the detection result that is different from the correct detection result can be prevented. As a result, the reduction of the estimation accuracy of the self-position and the increase of errors in the generation of the global map, both arising from posture changes of the autonomous moving apparatus 1, can be minimized and prevented.

According to the present preferred embodiment, even when the laser range finder 20 is inclined, if the state of inclination is not changing (i.e., if the state of inclination is constant), the self-position estimation and the global map generation based on the distance information acquired by the laser range finder 20 are executed. Therefore, in a situation where the autonomous moving apparatus 1 travels up a constantly-inclined slope, for example, the self-position estimation and the global map generation can be performed properly.

In the present preferred embodiment, when the state of inclination of the laser range finder 20 is changing, the self-position is estimated based on the travel amount of the autonomous moving apparatus 1 acquired from the rotation angles (i.e., the amount of wheel movement) of the four omni-wheels 13. Therefore, even if the self-position estimation based on the distance information acquired by the laser range finder 20 is stopped, the self-position can be obtained. Although errors due to skids or the like accumulate in the self-position estimation performed through the dead reckoning function, an area in which the state of inclination of the laser range finder 20 changes is small in the entire global map. Therefore, the error accumulation is not significant, and the self-position can be obtained.

In the present preferred embodiment, when the vibration of the laser range finder 20 ends, the self-position estimation and the global map generation based on the distance information acquired by the laser range finder 20 are resumed. As described above, when the laser range finder 20 is vibrating, the self-position is estimated based on the travel amount of the autonomous moving apparatus 1 acquired based on a drive amount (i.e., the amount of wheel movement) of the four omni-wheels 13. Therefore, the self-position estimation and the global map generation can be continued from the position estimated based on the drive amount. Moreover, since the detection area 20A of the laser range finder 20 has a wide fan-shaped form with the radius of about four meters, the area reflected from the local map acquired when the laser range finder 20 is vibrating can be covered by the area reflected from the local map that is acquired before/after the vibration. Therefore, even if the global map generation is stopped when the vibration occurs, there is only little influence. Moreover, even when the area reflected from the local map that could have been acquired at the time of vibration is not updated, since the updating state of the global map can be confirmed on the touch-screen display 40, the not-yet updated area can be reliably updated by moving the autonomous moving apparatus 1 using the joystick 50 to the position that can be updated.

Generally, the laser range finder has a high resolution and measurement accuracy in both the angular direction and the distance direction, and also can measure the distance between the apparatus and objects at high speed. Therefore, by measuring the distance between the apparatus and the object existing in the surroundings by the laser range finder 20 accurately at high speed, the self-position estimation and the global map generation can be performed with high accuracy at high speed.

The preferred embodiments of the present invention have been described, however, the present invention is not limited to the above preferred embodiments and can be modified in various ways. For example, in the above preferred embodiments, when the laser range finder 20 is inclined, and when the state of inclination is changing, the self-position estimation and the global map generation based on the distance information acquired by the laser range finder 20 are stopped. However, even if the state of inclination of the laser range finder 20 is not changing, the self-position estimation and the global map generation based on the distance information acquired by the laser range finder 20 may be stopped whenever the laser range finder 20 is inclined.

In the above preferred embodiments, the present invention is preferably applied to the autonomous moving apparatus 1 arranged to simultaneously estimate the self-position and generated the global map, however, the present invention may be applied to an apparatus that only estimates its self-position or to an apparatus that only generates a global map.

In the above preferred embodiments, the laser range finder 20 that uses the propagation time (i.e., using the "time propagation method") of the laser is preferably adopted, however, other detection principles such as a laser range finder using a light path displacement etc. may be adopted. In place of the laser range finder using the laser, a distance sensor etc., using infrared light, for example, may be also adopted.

In the above preferred embodiments, the Bayes' filter is preferably used when estimating the self-position, however, the self-position can be also estimated by using scan matching method such as an Iterative Closest Point (ICP) method, or the like.

In the above preferred embodiments, when the laser range finder 20 is vibrating, the distance information acquired by the laser range finder 20 preferably is not used, however, a stereo camera or the like may be further provided, for example, and the distance between the apparatus and an object may be acquired by recognizing, through the stereo camera, the object detected by the laser range finder 20, and then correcting the inclination of the laser range finder 20 when it is determined that the same object (for example, the same wall surface) as the object detected in the non-vibrating state has been detected. In such a case, the self-position estimation and the global map generation may be performed using the corrected distance information.

In the above preferred embodiments, the omni-wheels 13 capable of omnidirectional movement are preferably used as the wheels, however, a normal wheel (such as a steering wheel and a drive wheel, for example) may also be used.

Further, a unit that detects the inclination of the laser range finder with respect to a floor surface (or the ground) on which the autonomous moving apparatus is traveling may be provided, and when it is determined from detection results of the unit that the laser range finder is inclined with respect to the floor surface (or the ground), the self-position estimation and/or the global map generation using the detection results of the laser range finder may be stopped.

While the present invention has been described with respect to preferred embodiments thereof, it will be apparent to those skilled in the art that the disclosed invention may be modified in numerous ways and may assume many preferred embodiments other than those specifically set out and described above. Accordingly, the appended claims are intended to cover all modifications of the present invention that fall within the true spirit and scope of the present invention.

What is claimed is:

1. An autonomous moving apparatus arranged to move autonomously in a surrounding environment, the autonomous moving apparatus comprising:
    a distance measuring sensor arranged to output detection waves, detect a distance between the autonomous moving apparatus and an object which has reflected a detection wave based on a reflection of the detection wave, and acquire distance information about the distance between the autonomous moving apparatus and the object which has reflected the detection wave;
    an inclination sensor arranged to detect a state of inclination of the distance measuring sensor; and
    a control unit arranged to:
        estimate a self-position in the surrounding environment and generate a global map of the surrounding environment based on the distance information when a detection result of the inclination sensor indicates that the distance measuring sensor is in a state having a constant inclination amount, regardless of whether the distance measuring sensor is inclined or not;
        stop estimating the self-position and generating the global map based on the distance information when the detection result of the inclination sensor indicates that the distance measuring sensor is in state having a changing inclination amount; and
        resume estimating the self-position in the surrounding environment and generating the global map of the surrounding environment based on the distance information when the detection result of the inclination sensor indicates that the distance measuring sensor has changed from the state having the changing inclination amount to the state having the constant inclination amount.

2. The autonomous moving apparatus according to claim 1, further comprising:
    a plurality of wheels arranged to move the autonomous moving apparatus; wherein
    the control unit can acquire a travel amount of the autonomous moving apparatus in accordance with a rotation amount of each of the plurality of wheels, and estimate the self-position in the surrounding environment based on the acquired travel amount when the state of inclination of the distance measuring sensor is changing.

3. The autonomous moving apparatus according to claim 1, wherein the distance measuring sensor is a laser range finder.

4. The autonomous moving apparatus according to claim 1, further comprising a display arranged to display the global map generated by the control unit in real time.

5. The autonomous moving apparatus according to claim 4, wherein the display is arranged on a rear surface side of the autonomous moving apparatus and outside a detection area of the distance measuring sensor.

6. An autonomous moving apparatus arranged to autonomously move comprising:
a distance information acquiring unit arranged to output detection waves, detect a distance between the autonomous moving apparatus and an object which has reflected a detection wave based on the detection wave, and acquire distance information about the distance between the autonomous moving apparatus and the object which has reflected the detection wave;
a self-position estimating unit arranged to estimate a self-position based on the distance information acquired by the distance information acquiring unit;
a global map generating unit arranged to generate a global map based on the distance information; and
an inclination detecting unit arranged to detect a state of inclination of the distance information acquiring unit; wherein
when the distance information acquiring unit is determined to be undergoing a change in an amount of inclination because of a detection result of the inclination detecting unit, the self-position estimating unit stops estimating the self-position based on the distance information;
when the distance information acquiring unit is determined to be undergoing a change in an amount of inclination because of the detection result of the inclination detecting unit, the global map generating unit stops generating the global map based on the distance information;
when the distance information acquiring unit is determined to have a constant inclination angle because of the detection result of the inclination detecting unit, regardless of whether the distance measuring sensor is inclined or not, the self-position estimating unit resumes estimating the self-position based on the distance information; and
when the distance information acquiring unit is determined to have a constant inclination angle because of the detection result of the inclination detecting unit, regardless of whether the distance measuring sensor is inclined or not, the global map generating unit resumes generating the global map based on the distance information.

7. The autonomous moving apparatus according to claim 6, further comprising:
a plurality of wheels arranged to move the apparatus; and
a travel amount calculating unit arranged to acquire a travel amount of the apparatus based on a rotation amount of each of the plurality of wheels; wherein
when the state of inclination of the distance information acquiring unit detected by the inclination detecting unit is changing, the self-position estimating unit is arranged to estimate the self-position based on the travel amount acquired by the travel amount calculating unit.

8. The autonomous moving apparatus according to claim 6, wherein the distance information acquiring unit is a laser range finder.

9. The autonomous moving apparatus according to claim 6, further comprising a display unit arranged to display the global map generated by the global map generating unit in real time.

10. The autonomous moving apparatus according to claim 9, wherein the display unit is arranged on a rear surface side of the apparatus and outside a detection area of the distance information acquiring unit.

11. A method of estimating a self-position in an autonomous moving apparatus, the method comprising the steps of:
outputting detection waves;
detecting, based on a reflected detection wave, a distance between the autonomous moving apparatus and an object which has reflected the detection wave;
acquiring information about the distance between the autonomous moving apparatus and the object which has reflected the detection wave;
estimating the self-position based on the acquired distance information;
generating a global map based on the distance information;
detecting a state of inclination of the autonomous moving apparatus at a time of movement;
stopping estimating the self-position based on the distance information when the state of inclination of the autonomous moving apparatus indicates that a distance information acquiring unit of the autonomous moving apparatus is undergoing a change in an amount of inclination;
stopping generating the global map based on the distance information when the state of inclination of the autonomous moving apparatus indicates that the distance information acquiring unit of the autonomous moving apparatus is undergoing a change in an amount of inclination;
resuming estimating the self-position based on the distance information when the state of inclination of the autonomous moving apparatus indicates that the distance information acquiring unit of the autonomous moving apparatus is not undergoing a change in an amount of inclination, regardless of whether the distance measuring sensor is inclined or not; and
resuming generating the global map based on the distance information when the state of inclination of the autonomous moving apparatus indicates that the distance information acquiring unit of the autonomous moving apparatus is not undergoing a change in an amount of inclination, regardless of whether the distance measuring sensor is inclined or not.

12. The method of estimating the self-position according to claim 11, wherein when the state of inclination of the distance information acquiring unit of the autonomous moving apparatus is changing, in the self-position estimation step, the self-position is estimated based on a travel amount of the autonomous moving apparatus.

* * * * *